United States Patent [19]
Watanabe

[11] Patent Number: 6,166,767
[45] Date of Patent: Dec. 26, 2000

[54] ACTIVE SOLID-STATE IMAGING DEVICE WHICH EFFECTIVELY SUPPRESSES FIXED-PATTERN NOISE

[75] Inventor: Takashi Watanabe, Soraku-gun, Japan

[73] Assignee: Sharp Kabushiki Kaisha, Osaka, Japan

[21] Appl. No.: 08/963,398

[22] Filed: Nov. 3, 1997

[30] Foreign Application Priority Data

Dec. 10, 1996 [JP] Japan .................................... 8-330014

[51] Int. Cl.$^7$ .............................. H04N 3/14; H04N 5/217
[52] U.S. Cl. ........................... 348/301; 348/300; 348/241
[58] Field of Search ................................... 348/300, 301, 348/302, 303, 304, 307, 308, 241, 246, 249

[56] References Cited

U.S. PATENT DOCUMENTS

| | | | |
|---|---|---|---|
| 4,809,075 | 2/1989 | Akimoto et al. | 348/301 |
| 4,843,473 | 6/1989 | Bencuya et al. | 348/300 |
| 4,967,067 | 10/1990 | Hashimoto et al. | 348/300 |
| 5,274,459 | 12/1993 | Hamasaki | 348/249 |
| 5,296,696 | 3/1994 | Uno | 348/246 |
| 5,771,070 | 6/1998 | Ohzu et al. | 348/241 |

FOREIGN PATENT DOCUMENTS 8-078653  3/1996  Japan .

OTHER PUBLICATIONS

T. Nakamura, et al., *Television Society Paper*, vol. 41, No. 11, pp. 1047–1053, 1987, with partial English translation.

S.K. Mendis, et al., *IEDM 93*, pp. 583–586, 1993.

J. Hynecek, *IEEE Transactions on Electron Devices*, vol. 35, No. 5, pp. 646–652, 1998.

*Primary Examiner*—Tuan Ho
*Assistant Examiner*—Luong Nguyen
*Attorney, Agent, or Firm*—Dike, Bronstein, Roberts & Cushman, LLP; David G. Conlin; George W. Hartnell, III

[57] ABSTRACT

The active solid-state imaging device includes active photoelectric conversion elements each including a photoelectric conversion section and an amplification section for amplifying a signal charge generated by the photoelectric conversion section as a signal voltage, the active photoelectric conversion element being connected to a vertical signal line, the vertical signal line being connected to a common signal line via an impedance conversion section and a switch section, so that the signal voltage at the active photoelectric conversion element is transferred to the common signal line via the vertical signal line, the impedance conversion section, and the switch section, wherein the active solid-state imaging device further includes a reset section for resetting an input of the impedance conversion section at a reference voltage, and the input of the impedance conversion section is reset at the reference voltage by the reset section while the switch section is on and the signal voltage at the active photoelectric conversion section is being transferred to the common signal line, so that the signal voltage and the reference voltage are transferred to the common signal line as a set.

8 Claims, 8 Drawing Sheets

ACTIVE SOLID-STATE IMAGING DEVICE WHICH EFFECTIVELY SUPPRESSES FIXED-PATTERN NOISE

BACKGROUND OF THE INVENTION

1. Field of the Invention

The present invention relates to an active solid-state imaging device which effectively suppresses fixed-pattern noise.

2. Description of the Related Art

A solid-state imaging device which is called an active solid-state imaging device has been proposed, where signal charges generated in respective pixels are not directly read out, but they are amplified as voltages or currents in the respective pixels so that the amplified signal voltages or currents are read out via a scanning circuit.

In such an active solid-state imaging device, each pixel includes a photoelectric conversion section which generates a signal charge corresponding to incident light and an amplification section which amplifies the signal charge generated in the photoelectric conversion section as a signal voltage. The photoelectric conversion section and the amplification section may be arranged in the same plane or in layers. The pixel of the former type is called a horizontal type and that of the latter type is called a vertical type.

Pixels of an active pixel sensor (APS) as shown in FIG. 6 are known as an example of the horizontal-type pixel (see S. K. Mendis et al., "A 128×128 CMOS Active Pixel Image Sensor for Highly Integrated Imaging Systems", IEDM 93 (December 1993), pp. 583–586).

Referring to FIG. 6, a signal charge generated in a photoelectric conversion section 101 is transferred to the gate of a transistor 103 via a transistor 102 to be input into the transistor 103. The transistor 103 which is provided for impedance conversion amplifies the current of the signal. The output of the transistor 103 is read out as a signal voltage $V_{sig}$ via a pixel-selective transistor 104. After the signal voltage $V_{sig}$ has been output, a reset transistor 105 is turned on to discharge the signal charge accumulated in the gate of the transistor 103 to a drain $V_D$.

Pixels of a charge modulation device (CMD) as shown in FIG. 7 are known as an example of the vertical-type pixel (see Nakamura et al., "Gate-accumulation Type MOS Phototransistor Image Sensor", Television Academy, Vol. 41, No. 11 (1987), pp. 1047–1053).

Referring to FIG. 7, a signal charge generated by photoelectric conversion is accumulated in the gate of a transistor 111 to which an initial voltage has been applied. During the readout period, a pulse voltage $\phi_X$ is applied to the gate of the transistor 111 to read out a signal voltage $V_{sig}$ at the transistor 111. During the discharge period, a pulse voltage $\phi_R$ which is higher than the pulse voltage $\phi_X$ is applied to the gate of the transistor 111 to discharge the signal charge in the gate to a substrate (not shown). Thus, the transistor 111 conducts all of the photoelectric conversion, the amplification of signal charge, and the pixel selection.

In the CMD-type pixel, however, three different voltage values need to be selectively applied to the gate of the transistor 111, and at least one of the three voltage values must be high.

In order to avoid the use of a high voltage, a type which can be driven only at low voltages has been proposed in Japanese Laid-Open Publication No. 8-78653 which has been filed by the same applicant as that of the present invention. This type of pixel is shown in FIG. 8, where a signal charge is accumulated in the gate of a transistor 121, and a pulse voltage $\phi_X$ is applied to the gate to read out a signal voltage $V_{sig}$. During the discharge period, a pulse $\phi_R$ is applied to a transistor 122 to discharge the signal charge to a substrate shown as the grounding. With this configuration, both the pulse voltages $\phi_X$ and $\phi_R$ can be low. Thus, the driving with two low voltage values is possible.

All of the pixel configurations shown in FIGS. 6 to 8 can be represented by a common schematic view shown in FIG. 9. A photoelectric conversion section 131 not only conducts the photoelectric conversion, but also outputs a signal voltage in response to the pulse voltage $\phi_X$ and discharges the signal charge in response to the pulse voltage $\phi_R$. An amplification section 132 amplifies the received signal voltage and outputs the amplified signal voltage as the signal voltage $V_{sig}$.

FIG. 10 shows an example of an active solid-state imaging device having pixels with the above configuration.

Referring to FIG. 10, first horizontal scanning lines 143 extend from a first vertical scanning circuit 141, and second horizontal scanning lines 144 extend from a second vertical scanning circuit 142. The first and second horizontal scanning lines 143 and 144 and the vertical signal lines 140 cross each other, and pixels as shown in FIG. 9 are formed at the respective crossings of the lines.

The first vertical scanning circuit 141 sequentially selects the first horizontal scanning lines 143 to apply the pulse voltage $\phi_X$ to the photoelectric conversion sections 131 of the respective pixels via the selected first horizontal scanning lines 143. The photoelectric conversion sections 131 of the pixels of one horizontal row commonly connected to one first horizontal scanning line 143 receive the pulse voltage $\phi_X$ simultaneously, to output the respective signal voltages $V_{sig}$ to the corresponding vertical signal lines 140 via the amplification sections 132 of the pixels.

The second vertical scanning circuit 142 sequentially selects the second horizontal scanning lines 144 to apply the pulse voltage $\phi_R$ to the photoelectric conversion sections 131 of the respective pixels via the selected second horizontal scanning lines 144. The photoelectric conversion sections 131 of the pixels of one horizontal row commonly connected to one second horizontal scanning line 144 receive the pulse voltage $\phi_R$ simultaneously after the output of the respective signal voltages $V_{sig}$ to the corresponding vertical signal lines 140, to discharge the respective signal charges.

A correlated double sampling (CDS) circuit 147 is put in midway along each of the vertical signal lines 140 (see J. Hynecek, "A New Device Architecture Suitable for High Resolution and High Performance Image Sensors", IEEE Trans. Electron. Device, Vol. 35, No. 5 (May 1988), pp. 646–652).

The CDS circuit 147 receives the signal voltage $V_{sig}$ from the photoelectric conversion section 131 of each pixel. The CDS circuit 147 also receives a signal voltage $V_{res}$ from the photoelectric conversion section 131 of the pixel after the signal charge in the photoelectric conversion section 131 of the pixel has been discharged, to obtain the difference between the two signal voltages, i.e., the signal voltage $V_{sig}$ received during the readout period and the signal voltage $V_{res}$ received after the discharge period, and output a signal voltage representing the difference. By obtaining the difference between the signal voltage during the readout period and that after the discharge period for each pixel in this way, a threshold variation of the pixels (corresponding to the variation in the signal voltages after the discharge period) can be cancelled, and thereby fixed-pattern noise (FPN) caused by this variation can be suppressed.

The CDS circuit 147 includes a clamping circuit and a sample hold circuit. The clamping circuit has a clamping capacitor 149 and a clamping transistor 150. During the readout period, the signal voltage $V_{sig}$ from the photoelectric conversion section 131 of each pixel is input into the clamping capacitor 149. The clamping transistor 150 is turned on to convert the signal voltage $V_{sig}$ to a clamping voltage $V_{VCP}$, and then turned off. After the discharge period when the signal charge in the photoelectric conversion section 131 of the pixel is discharged, the signal voltage $V_{res}$ from the photoelectric conversion section 131 of the pixel is input into the clamping capacitor 149, and a difference signal voltage $[V_{VCP}-(V_{sig}-V_{res})]$ is obtained and held in the clamping circuit. If the clamping voltage $V_{VCP}$ is the grounding voltage, for example, a signal voltage $[-(V_{sig}-V_{res})]$ is held in the clamping circuit.

The sample hold circuit has a sampling transistor 151 and a source follower circuit drive transistor 152 for impedance conversion. After the formation of the difference signal voltage $[-(V_{sig}-V_{res})]$ by the clamping circuit, the sampling transistor 151 is turned on to allow the difference signal voltage $[-(V_{sig}-V_{res})]$ to be applied to the gate of the drive transistor 152. The drive transistor 152 is turned on, while holding the difference signal voltage $[-(V_{sig}-V_{res})]$ in the capacitance of the gate, to output the difference signal voltage $[-(V_{sig}-V_{res})]$ with an amplified current.

The above operation of the CDS circuit 147 is conducted for the respective pixels of one horizontal row. Thus, the difference signal voltages $[-(V_{sig}-V_{res})]$ based on the signal charges in the respective pixels of the horizontal row are output from the corresponding drive transistors 152.

The horizontal scanning circuit 145 sequentially turns on horizontal selective transistors 153 via vertical scanning lines 146. As the respective horizontal selective transistors 153 are sequentially turned on, the signal voltages $[-(V_{sig}-V_{res})]$ at the corresponding drive transistors 152 are sequentially transferred to a common signal line 154 via the horizontal selective transistors 153.

The common signal line 154 is connected at the output end thereof with a load transistor 155 which serves as a load for the drive transistors 152 and with transistors 156 and 157 which constitute a source follower circuit. The signal voltages $[-(V_{sig}-V_{res})]$ sequentially transferred from the respective drive transistors 152 to the common signal line 154 are output from a point between the transistors 156 and 157 as image signals OS.

FIG. 11 shows the timing of the signals used in the device shown in FIG. 10.

Referring to FIG. 11, a horizontal scanning period 1H is a period when the pixels of one horizontal row are scanned, i.e., the signal voltages at the pixels of one horizontal row are read out and transferred.

Pulse voltages $\phi_X(i)$, $\phi_X(i+1)$, $\phi_X(i+2)$, . . . , which determine the readout period for the respective horizontal rows of pixels, are output from the first vertical scanning circuit 141 to be sequentially applied to the first horizontal scanning lines 143. In response to the pulse voltages $\phi_X$, the photoelectric conversion sections 131 of the pixels of each horizontal row output the respective signal voltages $V_{sig}$.

Pulse voltages $\phi_R(i)$, $\phi_R(i+1)$, $\phi_R(i+2)$, . . . , which determine the discharge period for the respective horizontal rows of pixels, are output from the second vertical scanning circuit 142 to be sequentially applied to the second horizontal scanning lines 144. In response to the pulse voltages $\phi_R$, the photoelectric conversion sections 131 of the pixels of each horizontal row discharge the respective signal charges.

A pulse voltage $\phi_{VCP}$ is applied to the respective clamping transistors 150, while a pulse voltage $\phi_{VSH}$ is applied to the respective sampling transistors 151. These pulse voltages $\phi_{VCP}$ and $\phi_{VSH}$ are applied during the readout periods before and after the discharge periods, respectively. With these pulse voltages, the signal voltage obtained from each pixel during the readout period is clamped, the difference between the clamped signal voltage and the signal voltage obtained from each pixel after the discharge period is calculated, and the signal voltage representing the difference is sampled and held.

Pulse voltages $\phi_H(j)$, $\phi_H(j+1)$, . . . , which determine the output of the signal voltages at the drive transistors 152, are sequentially applied to the horizontal selective transistors 153 from the horizontal scanning circuit 145 after the readout periods. In response to the pulse voltages $\phi_H$, the signal voltages at the drive transistors 152 are sequentially transferred to the common signal line 154 via the respective horizontal selective transistors 153 to be finally output as the image signals OS.

Thus, the difference between the signal voltage obtained during the readout period and that obtained after the discharge period is calculated for each pixel, and the signal voltage representing the difference is output as the image signal OS. This effectively suppresses the fixed-pattern noise at the pixels caused by the threshold variation of the pixels.

However, although the fixed-pattern noise caused by the threshold variation of the pixels is suppressed, similar fixed-pattern noise arises due to a threshold variation of the drive transistors 152. This trouble has not yet been overcome.

The threshold variation of the drive transistors 152 is represented by a variation $\Delta V_T$ in the image signals OS.

The fixed-pattern noise caused by the threshold variation of the drive transistors 152 is common for pixels of a vertical column, though it is random horizontally on an image. As a result, a significant vertical stripe pattern is displayed on a screen, greatly degrading the display quality.

A variation in conductance also arises in the drive transistors 152, which results in a similar vertical stripe pattern.

In view of the foregoing, an objective of the present invention is to provide an active solid-state imaging device capable of greatly reducing the fixed-pattern noise caused by the drive transistors, i.e., transistors for holding and outputting sampled signal voltages.

SUMMARY OF THE INVENTION

The active solid-state imaging device of this invention includes active photoelectric conversion elements each including a photoelectric conversion section and an amplification section for amplifying a signal charge generated by the photoelectric conversion section as a signal voltage, the active photoelectric conversion element being connected to a vertical signal line, the vertical signal line being connected to a common signal line via an impedance conversion section and a switch section, so that the signal voltage at the active photoelectric conversion element is transferred to the common signal line via the vertical signal line, the impedance conversion section, and the switch section, wherein the active solid-state imaging device further includes a reset section for resetting an input of the impedance conversion section at a reference voltage, and the input of the impedance conversion section is reset at the reference voltage by the reset section while the switch section is on and the signal voltage at the active photoelectric conversion section is being transferred to the common signal line, so that the signal voltage and the reference voltage are transferred to the common signal line as a set.

With the above configuration, the input of the impedance conversion section is reset at the reference voltage by the reset section while the signal voltage at the active photoelectric conversion element is being transferred to the common signal line, so that the signal voltage and the reference voltage are transferred to the common signal line as a set. This makes it possible to calculate the difference between the signal voltage and the reference voltage in a subsequent circuit to use the difference as the signal voltage. In this way, the influence of the variation in characteristics of the impedance conversion sections, for example, the variations in threshold and conductance if the impedance conversion section is a transistor, can be eliminated, and thus the fixed-pattern noise at the pixels caused by the variation can be suppressed.

In one embodiment of the invention, a first clamping section for clamping a voltage from the active photoelectric conversion element and a first sample hold section for sampling and holding a voltage from the first clamping section are put in midway the vertical signal line, and the voltage held by the first sample hold section is input into the impedance conversion section as the signal voltage.

With the above configuration, the first clamping section clamps the signal voltage obtained from the active photoelectric conversion element during the readout period. After the discharge period, the first clamping circuit calculates the difference between the signal voltage obtained during the readout period and the signal voltage obtained after the discharge period, and the first sample hold circuit outputs the signal voltage representing the difference. In this way, the fixed-pattern noise caused by the variation in threshold of the pixels can be suppressed. This effect can be synergistically increased in combination with the effect of suppressing the fixed-pattern noise caused by the variation in characteristics of the impedance conversion sections.

In another embodiment of the invention, the reference voltage used by the reset section is a clamping voltage at the first clamping section.

In still another embodiment of the invention, there are a readout period when the signal voltage corresponding to the signal charge in the photoelectric conversion section is read from the active photoelectric conversion element and a discharge period when the signal charge in the photoelectric conversion section is discharged, the first clamping section clamps a signal voltage from the active photoelectric conversion element during the readout period, and calculates a difference between the signal voltage obtained from the active photoelectric conversion element during the readout period and a signal voltage obtained from the active photoelectric conversion element after the discharge period, and the first sample hold section samples and holds the difference calculated by the first clamping section and transfers the difference to the impedance conversion section as the signal charge.

In still another embodiment of the invention, the active solid-state imaging device further includes a second clamping section and a second sample hold section connected to the common signal line, and the second clamping section clamps the signal voltage out of the set of the signal voltage and the reference voltage transferred from the common signal line, and calculates a difference between the signal voltage and the reference voltage during the period when the reference voltage is being transferred, and the second sample hold section samples and holds the difference calculated by the second clamping section and outputs the difference.

In still another embodiment of the invention, the active solid-state imaging device further includes third and fourth sample hold sections and an operation section for calculating a difference between outputs of the third and fourth sample hold sections, wherein the third sample hold section samples and holds the signal voltage out of the set of the signal voltage and the reference voltage, the fourth sample hold section samples and holds the reference voltage out of the set of the signal voltage and the reference voltage, and the operation section calculates a difference between the signal voltage held by the third sample hold section and the reference held by the fourth sample hold section, and outputs the difference.

In still another embodiment of the invention, the active photoelectric conversion elements are a plurality of active photoelectric conversion elements ar ranged in a matrix, the signal voltage corresponding to the signal charge in the photoelectric conversion section of each of the active photoelectric conversion elements is read during the readout period, and the signal charge in the photoelectric conversion section is discharged during the discharge period, the first clamping section clamps the signal voltage obtained from the active photoelectric conversion element during the readout period, the first clamping section calculates the difference between the signal voltage obtained from the active photoelectric conversion element during the readout period and a signal voltage obtained from the active photoelectric conversion element after the discharge period, and the first sample hold section samples and holds the difference, the difference is transferred to the common signal line via the impedance conversion section and the switch section as the signal voltage, and the reset section resets the input of the impedance conversion section at the reference voltage while the signal voltage is being transferred to the common signal line, so that the signal voltage and the reference voltage are transferred to the common signal line as a set, the above operations are conducted for the active photoelectric conversion elements of one horizontal row, and the above operations conducted for the active photoelectric conversion elements of one horizontal row are repeated for the active photoelectric conversion elements of the remaining horizontal rows.

In still another embodiment of the invention, the active photoelectric conversion elements are a plurality of active photoelectric conversion elements arranged in a matrix, the signal voltage corresponding to the signal charge in the photoelectric conversion section of each of the active photoelectric conversion elements is read during the readout period, and the signal charge in the photoelectric conversion section is discharged during the discharge period, the first clamping section clamps the signal voltage obtained from the active photoelectric conversion element during the readout period, the first clamping section calculates the difference between the signal voltage obtained from the active photoelectric conversion element during the readout period and a signal voltage obtained from the active photoelectric conversion element after the discharge period, and the first sample hold section samples and holds the difference, the difference is transferred to the common signal line via the impedance conversion section and the switch section as the signal voltage, and the reset section resets the input of the impedance conversion section at the reference voltage while the signal voltage is being transferred to the common signal line, so that the signal voltage and the reference voltage are transferred to the common signal line as a set, the above operations are conducted for the active photoelectric conversion elements of one horizontal row, as a subsequent operation, an additional discharge period is provided while the state is kept unchanged without clamping, so as to calculate again the difference between the signal voltage obtained from the active photoelectric conversion element during the readout period and a signal voltage obtained from the active photoelectric conversion element after the additional discharge period, the difference is sampled and held by the first sample hold section, the difference is transferred to the common signal line via the impedance conversion section and the switch section as the signal voltage, and the reset section resets the input of the impedance conversion section at the reference voltage while the signal voltage is being transferred to the common signal line, so that the signal voltage and the reference voltage are transferred to the common signal line as a set, the subsequent operation is conducted for the active photoelectric conversion elements of one horizontal row and this is repeated for a predetermined number of times, and the above operations conducted for the active photoelectric conversion elements of one horizontal row are repeated for the active photoelectric conversion elements of the remaining horizontal rows.

Thus, the invention described herein makes possible the advantage of providing an active solid-state imaging device capable of greatly reducing fixed-pattern noise caused by transistors for holding and outputting sampled signal voltages.

This and other advantages of the present invention will become apparent to those skilled in the art upon reading and understanding the following detailed description with reference to the accompanying figures.

DESCRIPTION OF THE PREFERRED EMBODIMENTS

Hereinbelow, the present invention will be described by way of examples with reference to the accompanying drawings.

Figure 1:
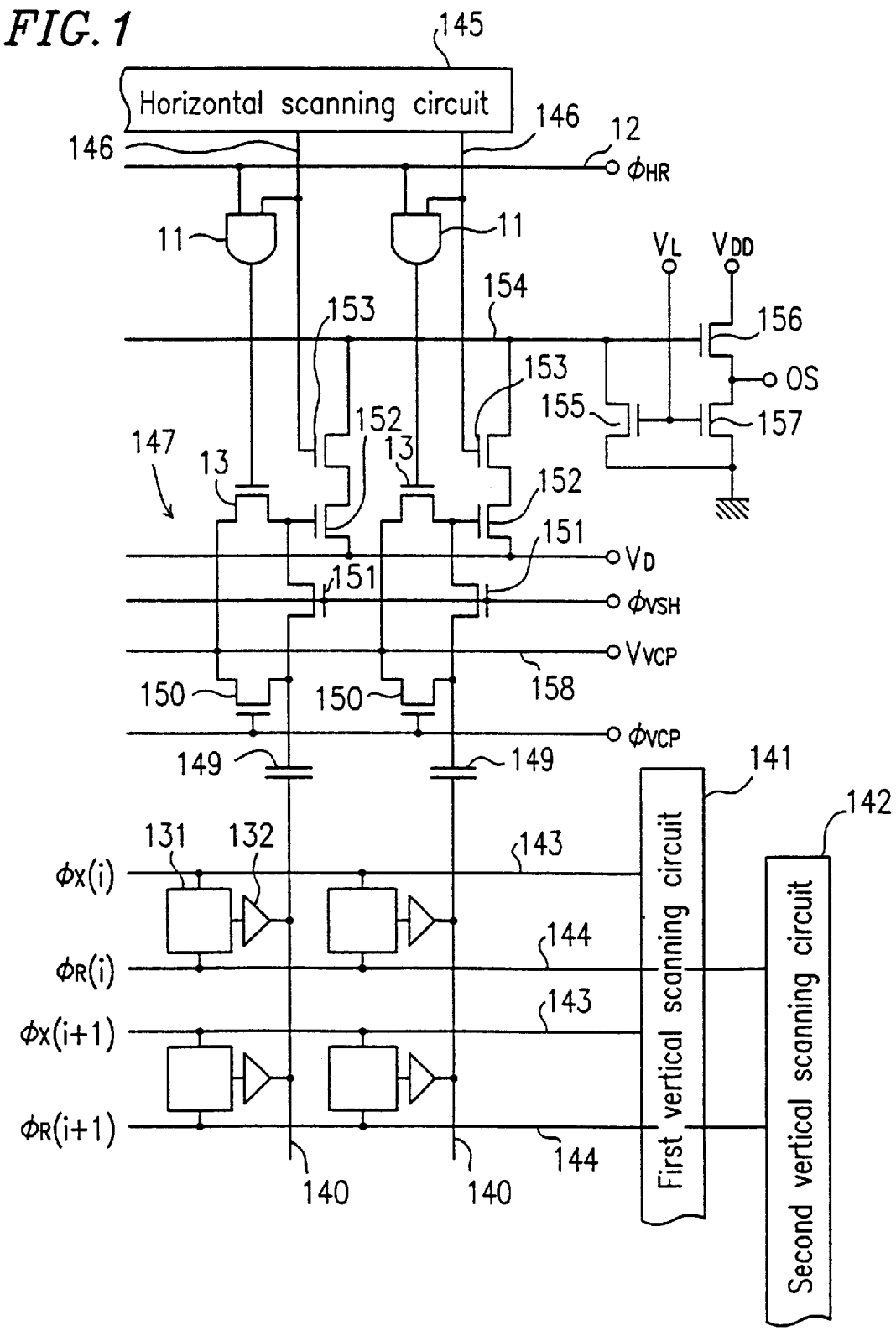
FIG. 1 is a circuit diagram of an example of the active solid-state imaging device according to the present invention.
Figure 10:
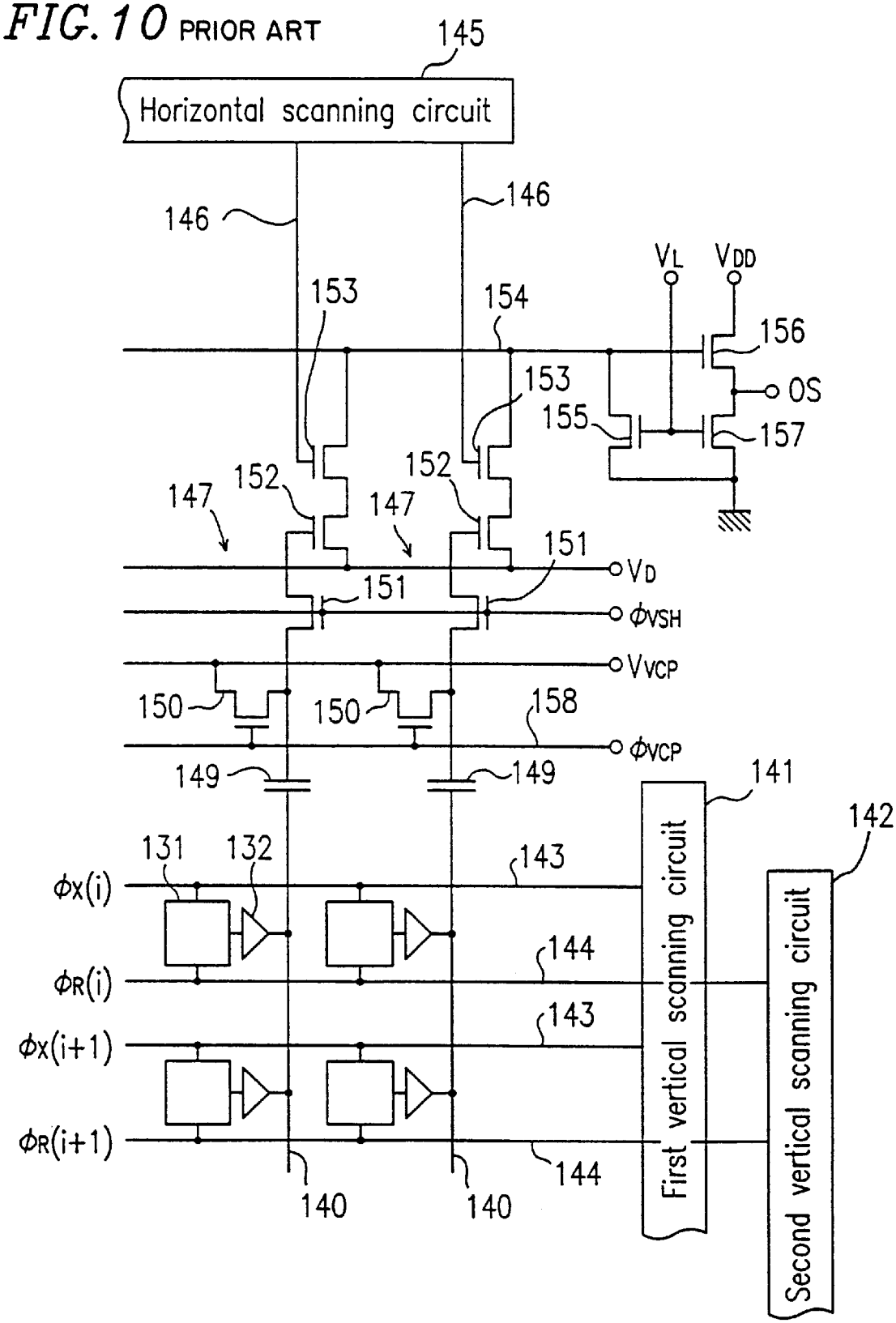
FIG. 10 is a block diagram of a conventional active solid-state imaging device.

FIG. 1 shows an example of the active solid-state imaging device according to the present invention. In the active solid-state imaging device according to the present invention, AND circuits 11, a control signal line 12, and reset transistors 13 are provided in addition to the configuration of the conventional active solid-state imaging device shown in FIG. 10. Components having similar functions to those shown in FIG. 10 are denoted by the same reference numerals.

Each of the AND circuits 11 receives a pulse voltage $\phi_{HR}$ via the control signal line 12, as well as a signal from the horizontal scanning circuit 145 via the corresponding vertical scanning line 146, and outputs the logical AND between these inputs to the corresponding reset transistor 13.

The reset transistor 13 is turned on in response to the logical AND from the corresponding AND circuit 11 to connect the gate of the corresponding drive transistor 152 with a signal line 158 for the clamping voltage $V_{VCP}$. This resets the input of the drive transistor 152 at a reference voltage $V_{SET}$, which is then output from the drive transistor 152.

The photoelectric conversion sections 131 of the pixels of each horizontal row receive the pulse voltage $\phi_X$ from the first vertical scanning circuit 141 simultaneously during the readout period, to output the respective signal voltages $V_{sig}$ to the respective signal lines 140 via the amplification sections 132 of the pixels. The photoelectric conversion sections 131 of the pixels of the horizontal row also receive the pulse voltage $\phi_R$ from the second vertical scanning circuit 142 simultaneously during the discharge period, to discharge the respective signal charges.

In the clamping circuit, each of the clamping transistors 150 is turned on during the readout period to convert the signal voltage $V_{sig}$ to the clamping voltage $V_{VCP}$, and then turned off. After the signal charge in the pixel has been discharged, the signal voltage $V_{res}$ at the pixel is received by the clamping capacitor 149, so as to calculate the difference signal voltage $[V_{VCP}-(V_{sig}-V_{res})]$. If the clamping voltage $V_{VCP}$ is the grounding potential, for example, the difference signal voltage $[-(V_{sig}-V_{res})]$ is obtained.

In the sample hold circuit, after the formation of the difference signal voltage $[-(V_{sig}-V_{res})]$ by the clamping circuit, the sampling transistor 151 is turned on to apply the difference signal voltage $[-(V_{sig}-V_{res})]$ to the gate of the drive transistor 152. The drive transistor 152 is turned on, while holding the difference signal voltage $[-(V_{sig}-V_{res})]$ in the capacitance of the gate, to output the difference signal voltage $[-(V_{sig}-V_{res})]$ with an amplified current.

At this time, the horizontal selective transistor 153 is turned on in response to the signal sent from the horizontal scanning circuit 145 via the corresponding vertical scanning line 146, to allow the signal voltage $[-(V_{sig}-V_{res})]$ from the drive transistor 152 to be transferred to the common signal line 154.

During the transfer of the signal voltage $[-(V_{sig}-V_{res})]$ at the drive transistor 152 to the common signal line 154, the output of the AND circuit 11, i.e., the logical AND between the signal supplied from the horizontal scanning circuit 145 to the horizontal selective transistor 153 via the vertical scanning line 146 and the pulse voltage $\phi_{HR}$ supplied via the control signal line 12, becomes high, thereby turning on the reset transistor 13. This resets the gate of the drive transistor 152 at the reference voltage $V_{SET}$.

Thus, the drive transistor 152 outputs the signal voltage $[-(V_{sig}-V_{res})]$ and the reference voltage $V_{SET}$ in sequence, which are transferred as a set to the common signal line 154.

The above operation is conducted for all the pixels of one horizontal row. As a result, the sets of the signal voltages $[-(V_{sig}-V_{res})]$ based on the signal charges in pixels and the reference voltages $V_{SET}$ for the respective pixels of one horizontal row are sequentially transferred to the common signal line 154.

The sets of the signal voltages $[-(V_{sig}-V_{res})]$ and the reference voltages $V_{SET}$ for the respective pixels are output from the point between the transistors 156 and 157 as the image signals OS.

Figure 2:
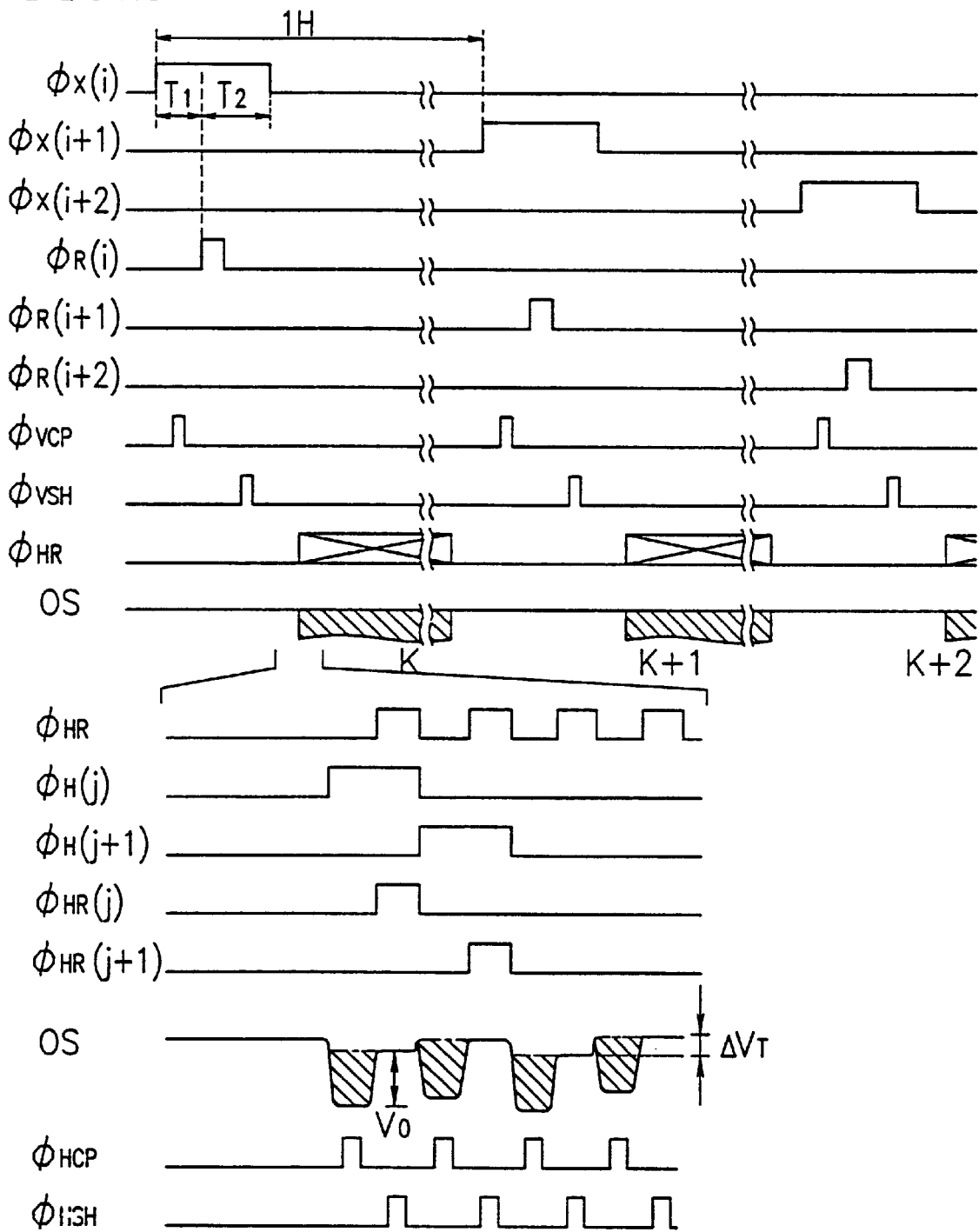
FIG. 2 is a timing chart of signals used in the device of FIG. 1.
Figure 11:
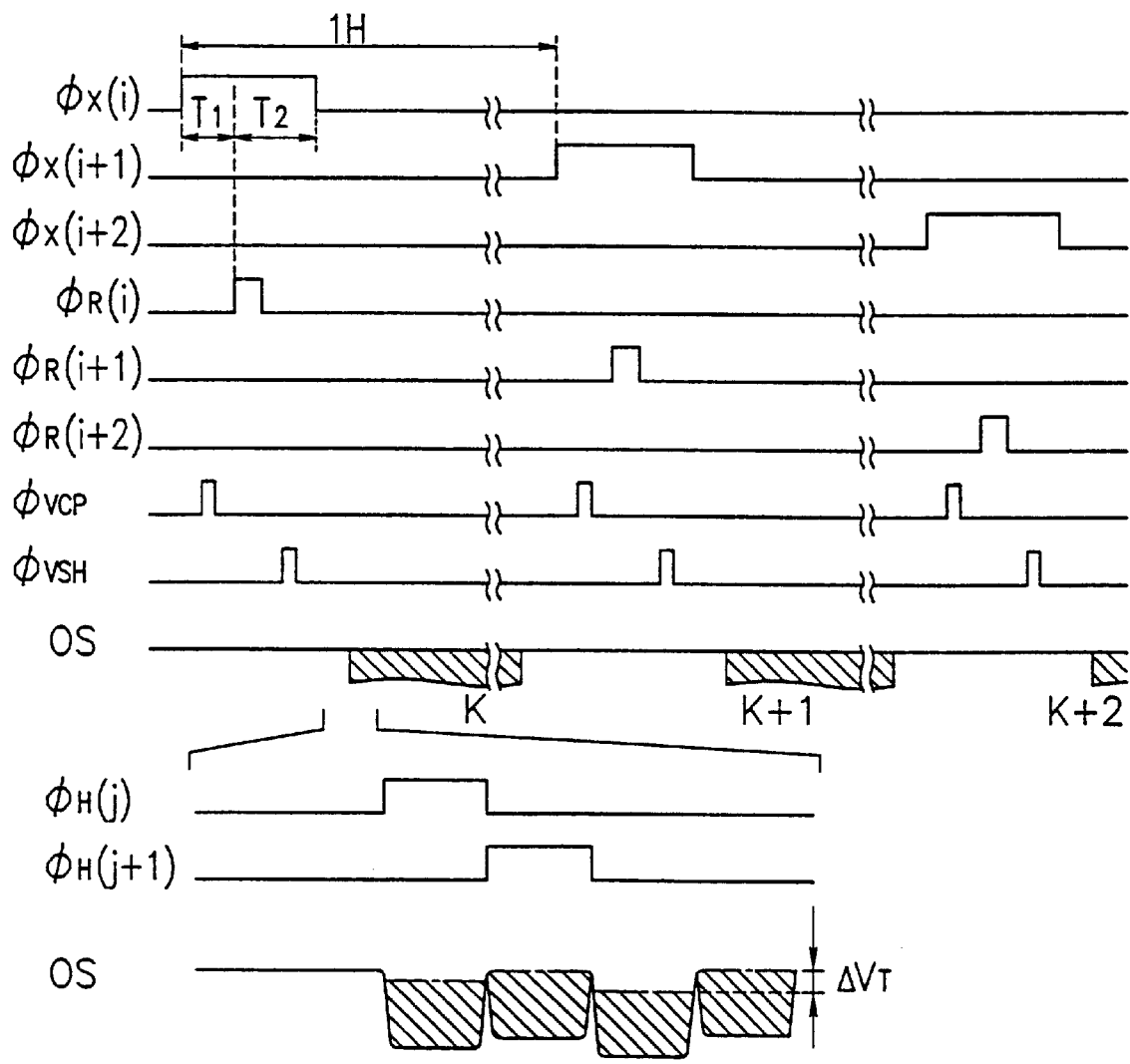
FIG. 11 is a timing chart of signals used in the device of FIG. 10.

FIG. 2 shows the timing of the signals used in the device of this example. The signals having similar functions to those shown in FIG. 11 are denoted by the same reference codes.

Referring to FIG. 2, the pulse voltages $\phi_X(i)$, $\phi_X(i+1)$, $\phi_X(i+2)$, ... are sequentially applied from the first vertical scanning circuit 141 to the first horizontal scanning lines 143. In response to the pulse voltages $\phi_X$, the pixels of each horizontal row output the respective signal voltages $V_{sig}$.

The pulse voltages $\phi_R(i)$, $\phi_R(i+1)$, $\phi_R(i+2)$, ... are sequentially applied from the second vertical scanning circuit 142 to the second horizontal scanning lines 144. In response to the pulse voltages $\phi_R$, the pixels of each horizontal row discharge the respective signal charges.

The pulse voltage $\phi_{VCP}$ is applied to the clamping transistors 150, and the pulse voltage $\phi_{VSH}$ is applied to the sampling transistors 151. In response to these pulse voltages $\phi_{VCP}$ and $\phi_{VSH}$, the signal voltage obtained from each pixel during the readout period is clamped, the difference between the clamped signal voltage and the signal voltage obtained from the pixel after the discharge period is calculated, and the signal voltage representing the difference is sampled and held.

The pulse voltage $\phi_{HR}$ is applied via the control signal line 12 in synchronization with the pulse voltages $\phi_H(j)$, $\phi_H(j+1)$, ... to be applied to the drive transistors 152 from the horizontal scanning circuit 145, and becomes high at a certain time during the period when each of the pulse voltages $\phi_H(j)$, $\phi_H(j+1)$, ... is high.

The AND circuits 11, which receive both the pulse signal $\phi_{HR}$ via the control signal line 12 and the respective pulse voltages $\phi_H(j)$, $\phi_H(j+1)$, ..., output high-level logical AND pulses $\phi_{HR}(j)$, $\phi_{HR}(j+1)$, ... at certain times during the periods when the pulse voltages $\phi_H(j)$, $\phi_H(j+1)$, ... are high.

The logical AND pulses $\phi_{HR}(j)$, $\phi_{HR}(j+1)$, ... are sequentially applied to the respective reset transistors 13 to sequentially turn on the reset transistors 13. Consequently, the gates of the respective drive transistors 152 are sequentially reset while they are outputting the signal voltages $[-(V_{sig}-V_{res})]$, setting the potentials at the gates at the reference voltage $V_{SET}$.

This results in that the drive transistors 152 output the sets of the signal voltages $[-(V_{sig}-V_{res})]$ and the reference voltages $V_{SET}$ to the common signal line 154 one after another.

The sets of the signal voltages $[-(V_{sig}-V_{res})]$ and the reference voltages $V_{SET}$ sequentially transferred from the respective drive transistors 152 to the common signal line 154 as described above are then utilized in a subsequent circuit, where the difference between the signal voltage $[-(V_{sig}-V_{res})]$ and the reference voltage $V_{SET}$ of the set for each drive transistor 152 is calculated, and this difference is used as the signal voltage for the corresponding pixel. This makes it possible to eliminate the influence of the variations in threshold and conductance of the drive transistors 152, and thus to suppress the fixed-pattern noise at pixels due to these variations.

Figure 3:
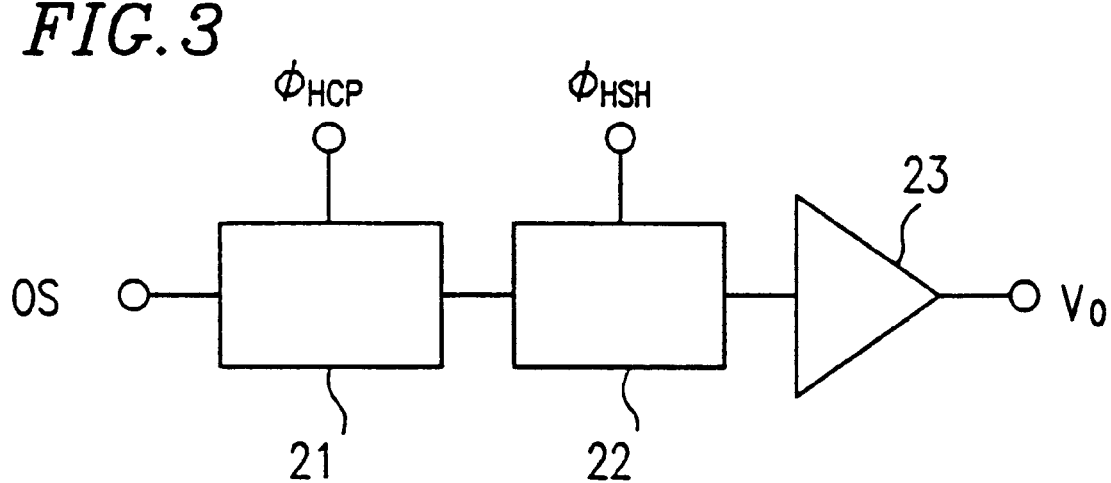
FIG. 3 is a block diagram of a circuit for processing the output of the device of FIG. 1.

FIG. 3 shows an example of such a subsequent circuit which calculates the difference between the signal voltage $[-(V_{sig}-V_{res})]$ and the reference voltage $V_{SET}$ sent from each drive transistor 152, to use this difference as the signal voltage of the corresponding pixel.

Referring to FIG. 3, a second clamping circuit 21 sequentially receives the sets of the signal voltages $[-(V_{sig}-V_{res})]$ and the reference voltages $V_{SET}$ output from the point between the transistors 156 and 157 as the image-signal OS.

The second clamping circuit 21 receives a pulse voltage $\phi_{HCP}$ (shown in FIG. 2) during the period when the signal voltage $[-(V_{sig}-V_{res})]$ is being input for each set of the signal voltage $[-(V_{sig}-V_{res})]$ and the reference voltage $V_{SET}$, to clamp the signal voltage $[-(V_{sig}-V_{res})]$. During the subsequent input of the reference voltage $V_{SET}$, the second clamping circuit 21 calculates the difference between the clamped signal voltage $[-(V_{sig}-V_{res})]$ and the reference voltage $V_{SET}$, and outputs a voltage representing the difference.

A second sample hold circuit 22 holds the difference voltage sent from the second clamping circuit 21 in response to the input of a pulse voltage $\phi_{HSH}$ (shown in FIG. 2), and outputs the difference voltage via an amplification circuit 23.

Figure 4:
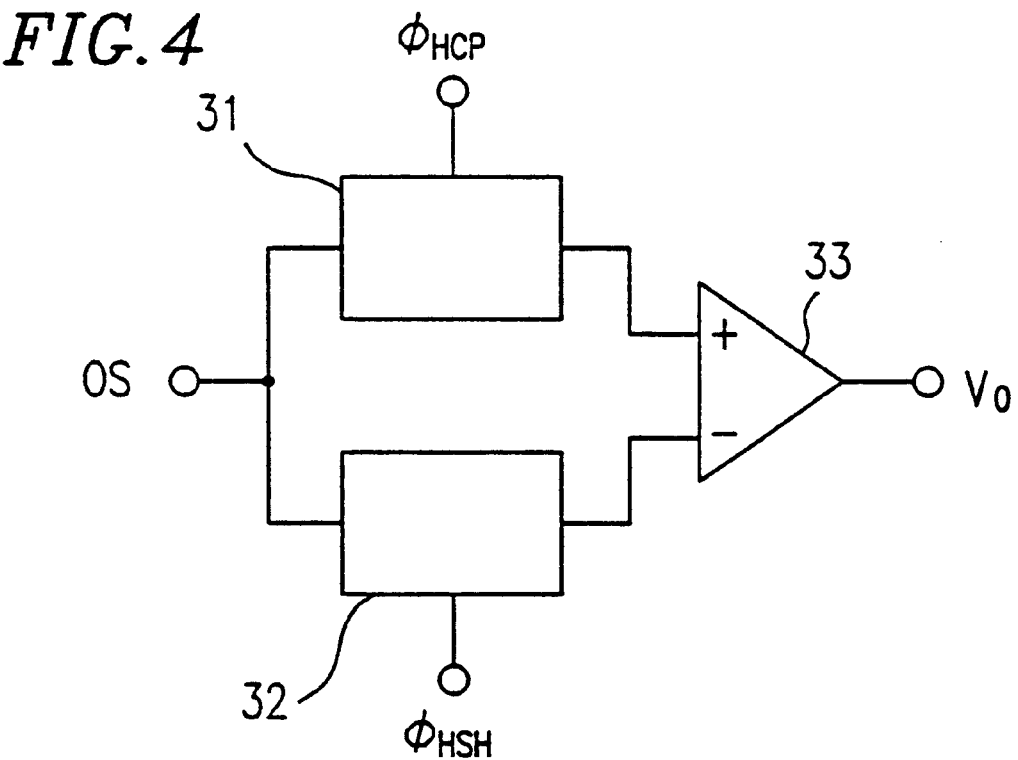
FIG. 4 is a block diagram of another circuit for processing the output of the device of FIG. 1.

FIG. 4 shows another example of the circuit which calculates the difference between the signal voltage $[-(V_{sig}-V_{res})]$ and the reference voltage $V_{SET}$ sent from each drive transistor 152, to use this difference as the signal voltage of the corresponding pixel.

Referring to FIG. 4, a third sample hold circuit 31 receives the pulse voltage $\phi_{HCP}$ (shown in FIG. 2) during the period when the signal voltage $[-(V_{sig}-V_{res})]$ is being input, to hold the signal voltage $[-(V_{sig}-V_{res})]$. A fourth sample hold circuit 32 receives the pulse voltage $\phi_{HSH}$ (shown in FIG. 2) during the period when the reference voltage $V_{SET}$ is being input, to hold the reference voltage $V_{SET}$.

A differential amplification circuit 33 calculates the difference between the signal voltage $[-(V_{sig}-V_{res})]$ and the reference voltage $V_{SET}$, and outputs a voltage representing the difference.

In the active solid-state imaging device of this example, after the output of each of the drive transistors 152 is transferred via the corresponding horizontal selective transistor 153, the gate of the drive transistor 152 is connected with the signal line 158 for the clamping voltage $V_{VCP}$ as the reset transistor 13 is turned on. The signal charge in the gate of the drive transistor 152 is then discharged via the signal line 158. Therefore, it is not possible to read out the output of the drive transistor 152 repeatedly.

Hereinbelow, an alternative example of the active solid-state imaging device according to the present invention where the output of the drive transistor 152 can be read out repeatedly will be described.

The active solid-state imaging device of this alternative example has the same configuration as that shown in FIG. 1. The timing of the signals used in this device is shown in FIG. 5 which is different from that shown in FIG. 2.

Figure 5:
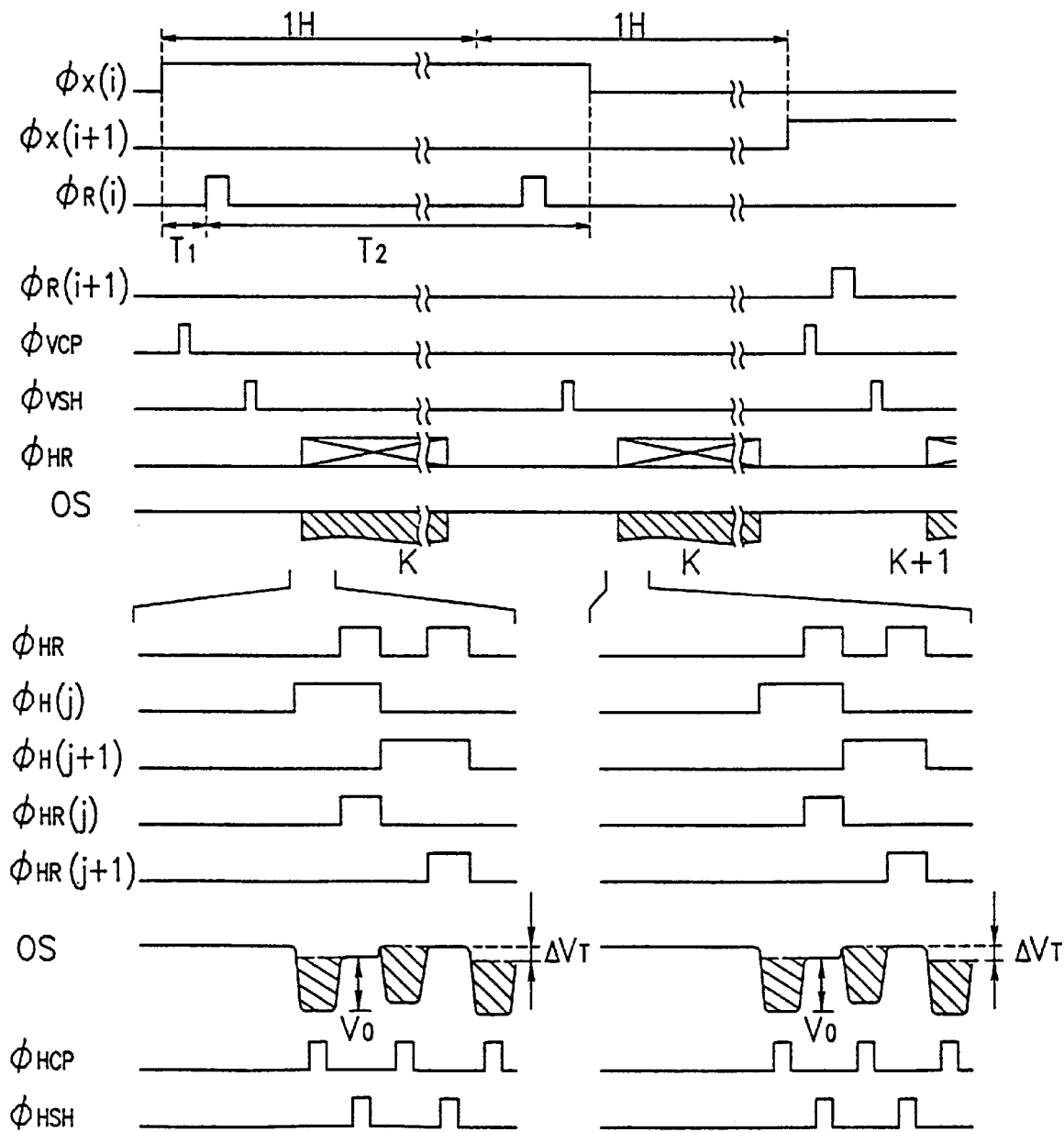
FIG. 5 is a timing chart of signals used in another example of the active solid-state imaging device according to the present invention.
Figure 6:
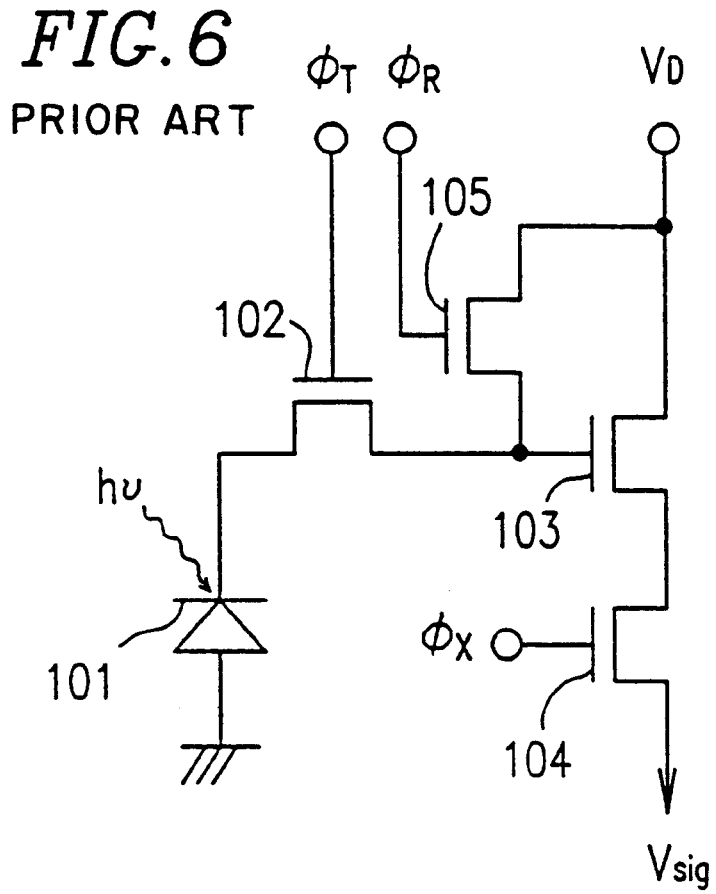
FIG. 6 is a circuit diagram of a conventional horizontal-type pixel.
Figure 7:
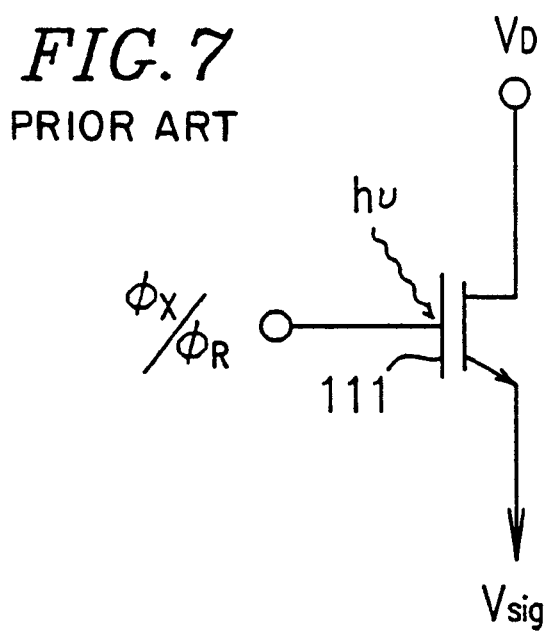
FIG. 7 is a circuit diagram of a conventional vertical-type pixel.
Figure 8:
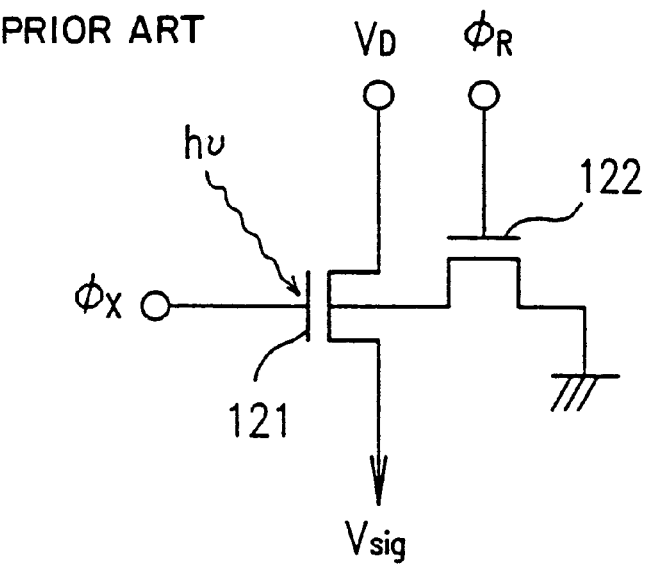
FIG. 8 is a circuit diagram of another conventional pixel.
Figure 9:
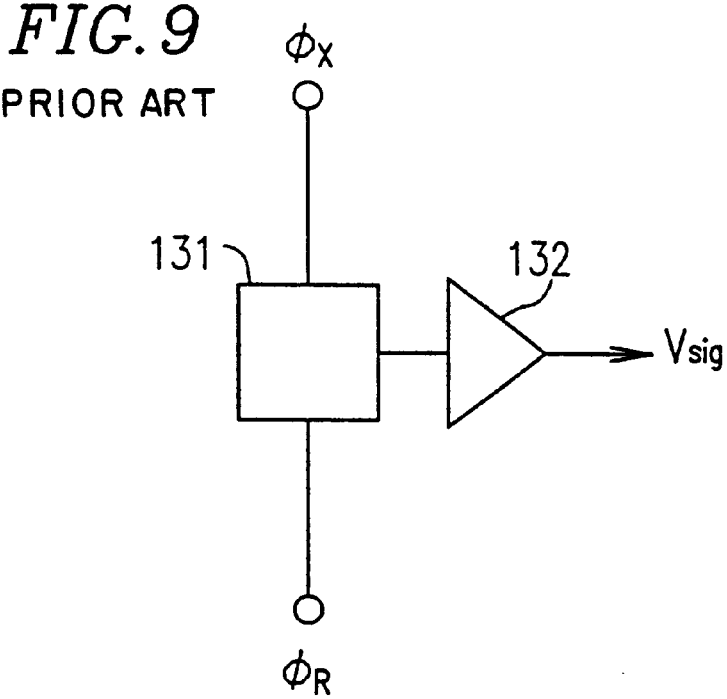
FIG. 9 is a schematic block diagram of the circuits of FIGS. 6 to 8.

Referring to FIG. 5, the operation of reading out signal voltages at pixels of one horizontal row during one horizontal scanning period (1H) is repeated twice. This repetition of the operation is applied to all the horizontal rows of pixels. The readout from the respective horizontal rows of pixels is therefore conducted every two horizontal scanning periods (2H). The actual horizontal scanning period for each horizontal row of pixels in this example is then twice as long as that shown in FIG. 2.

The pulse of each of the pulse voltages $\phi_X(i)$, $\phi_X(i+1)$, ..., which determines the readout period for each horizontal row of pixels, is set longer than one horizontal scanning period 1H shown in FIG. 2. In response to the pulse voltages $\phi_X$, the photoelectric conversion sections 131 of the pixels of each horizontal row output the respective signal voltages $V_{sig}$.

The pulse voltages $\phi_R(i)$, $\phi_R(i+1)$, ..., which determine the discharge period for the respective horizontal rows of pixels, become high twice during the readout period for the respective horizontal rows of pixels. In response to the first pulses of the pulse voltages $\phi_R$, the photoelectric conversion sections 131 of the pixels of each horizontal row discharge the respective signal charges.

Accordingly, the signal voltage $V_{sig}$ is output from each of the pixels of each horizontal row during a period $T_1$ from the start of the readout period to the first pulse of the pulse voltage $\phi_R$. During the subsequent remaining period, a period $T_2$, since the signal charge in each pixel has been discharged, the signal voltage $V_{res}$ obtained after the discharge of the signal charge is output from the pixel.

The pulse voltage $\phi_{VCP}$, which becomes high once during the readout period for each horizontal row of pixels, is applied to the clamping transistors 150 to allow the clamping transistors 150 to clamp the signal voltages $V_{sig}$ read from the pixels.

The pulse voltage $\phi_{VSH}$, which becomes high following the pulses of the pulse voltages $\phi_R(i)$, $\phi_R(i+1)$, ..., i.e., becomes high twice during the readout period for each horizontal row of pixels, is applied to the sampling transistors 151 to allow the sampling transistors 151 to sample and hold the difference between the signal voltage $V_{sig}$ from each pixel and the signal voltage $V_{res}$ obtained after the discharge period.

The respective pulse voltages $\phi_H(j)$, $\phi_H(j+1)$, ... as readout signals supplied from the horizontal scanning circuit 145 become high in synchronization with the pulse voltage $\phi_{HR}$ supplied via the control signal line 12 after the first and second pulses of the pulse voltages $\phi_{VSH}$. In response to these pulses in synchronization with the pulse voltage $\phi_{HR}$, the outputs of the drive transistors 152 are transferred to the common signal line 154.

In this alternative example, the signal voltage $V_{sig}$ is output from each pixel only during the period $T_1$. Over the subsequent period $T_2$, the signal voltage $V_{res}$ obtained after the discharge period is continuously output. However, once the signal voltage $V_{sig}$ from each pixel is clamped by the clamping transistor 150 in response to the pulse voltage $\phi_{VCP}$, the value of the signal voltage $V_{sig}$ is virtually kept clamped thereby as the clamp potential $V_{VCP}$ though the real potential at the clamping circuit varies in response to the pulse voltage $\phi_R$. In other words, the signal voltage representing the difference between the signal voltage $V_{sig}$ and the signal voltage $V_{res}$ obtained after the discharge period is obtained by subtracting the difference from the clamp potential $V_{VCP}$ whenever the pulse voltage $\phi_R$ is applied. Accordingly, the difference signal voltage can be held by adding it to the capacitance at the gate of the drive transistor 152 when the second pulse of the pulse voltage $\phi_{VSH}$ is applied to the sampling transistor 151, as well as when the first one is applied.

As a result, the difference signal voltages are transferred from the drive transistors 152 to the common signal line 154 after the first pulse of the pulse voltage $\phi_{VSH}$ in response to the pulse voltages $\phi_H(j)$, $\phi_H(j+1)$, ... as the horizontal readout signals in synchronization with the pulse voltage $\phi_{HR}$. Also, the difference signal voltages are transferred from the drive transistors 152 to the common signal line 154 after the second pulse of the pulse voltage $\phi_{VSH}$ in response to the pulse voltages $\phi_H(j)$, $\phi_H(j+1)$, ... in synchronization with the pulse voltage $\phi_{HR}$.

In other words, the same output from each of the drive transistors 152 is read out twice during the two horizontal scanning periods 2H.

The value of the signal voltage $V_{sig}$ is virtually kept clamped by the clamping circuit as the clamping potential $V_{VCP}$ until the pulse voltage $\phi_{VCP}$ becomes high again. Accordingly, it is also possible to further extend the horizontal scanning period to apply three or more pulses of the pulse voltage $\phi_{VSH}$ to each of the sampling transistors 151 and to read the output of the drive transistor 152 three times or more. In this case, also, the influence of the variation in characteristics of the drive-transistors 152 can be eliminated since the output of each drive transistor 152 is transferred together with the reference voltage $V_{SET}$ as a set.

Thus, according to the present invention, the input of the impedance conversion section is reset at the reference voltage by the reset section while a signal voltage at the active photoelectric conversion element is being transferred to the common signal line, so that the signal voltage and the reference voltage are transferred to the common signal line as a set. This makes it possible to calculate the difference between the signal voltage and the reference voltage in a subsequent circuit, to use the difference as the signal voltage. In this way, the influence of the variation in characteristics of the impedance conversion sections can be eliminated, and thus the fixed-pattern noise at the pixels caused by this variation can be suppressed.

The present invention may be combined with the known CDS technique which eliminates the influence of the threshold variation of the pixels. With this arrangement, the fixed-pattern noise can be greatly reduced, and significantly high-quality images can be obtained.

According to the present invention, a same signal voltage can be read out repeatedly while the signal voltage is being transferred to the common signal line together with a reference voltage as a set. With this capability, various applications can be expected.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active solid-state imaging device comprising active photoelectric conversion elements each including a photoelectric conversion section and an amplification section for amplifying a signal charge generated by the photoelectric conversion section as a signal voltage, the active photoelectric conversion element being connected to a vertical signal line, the vertical signal line being connected to a common signal line via an impedance conversion section and a switch section, so that the signal voltage at the active photoelectric conversion element is transferred to the common signal line via the vertical signal line, the impedance conversion section, and the switch section, wherein the active solid-state imaging device further comprises a reset section for resetting an input of the impedance conversion section at a reference voltage, and the input of the impedance conversion section is reset at the reference voltage by the reset section while the switch section is on and the signal voltage at the active photoelectric conversion section is being transferred to the common signal line, so that the signal voltage and the reference voltage are transferred to the common signal line as a set.

2. An active solid-state imaging device according to claim 1, wherein a first clamping section for clamping a voltage from the active photoelectric conversion element and a first sample hold section for sampling and holding a voltage from the first clamping section are put between the vertical signal line and the impedance conversion section, and the voltage held by the first sample hold section is input into the impedance conversion section as the signal voltage.

3. An active solid-state imaging device according to claim 2, wherein the reference voltage used by the reset section is a clamping voltage at the first clamping section.

4. An active solid-state imaging device according to claim 2, wherein there are a readout period when the signal voltage corresponding to the signal charge in the photoelectric conversion section is read from the active photoelectric conversion element and a discharge period when the signal charge in the photoelectric conversion section is discharged, the first clamping section clamps a signal voltage from the active photoelectric conversion element during the readout period, and measures a difference between the signal voltage obtained from the active photoelectric conversion element during the readout period and a signal voltage obtained from the active photoelectric conversion element after the discharge period, and the first sample hold section samples and holds the difference measured by the first clamping section and transfers the difference to the impedance conversion section as the signal charge.

5. An active solid-state imaging device according to claim 1, further comprising a second clamping section and a second sample hold section connected to the common signal line, and the second clamping section clamps the signal voltage out of the set of the signal voltage and the reference voltage transferred from the common signal line, and measures a difference between the signal voltage and the reference voltage during the period when the reference voltage is being transferred, and the second sample hold section samples and holds the difference measured by the second clamping section and outputs the difference.

6. An active solid-state imaging device according to claim 1, further comprising a third and fourth sample hold sections and an operation section for calculating a difference between outputs of the third and fourth sample hold sections, wherein the third sample hold section samples and holds the signal voltage out of the set of the signal voltage and the reference voltage, the fourth sample hold section samples and holds the reference voltage out of the set of the signal voltage and the reference voltage, and the operation section measures a difference between the signal voltage held by the third sample hold section and the reference voltage held by the fourth sample hold section, and outputs the difference.

7. An active solid-state imaging device according to claim 2, wherein the active photoelectric conversion elements are a plurality of active photoelectric conversion elements arranged in a matrix, the signal voltage corresponding to the signal charge in the photoelectric conversion section of each of the active photoelectric conversion elements is read during the readout period, and the signal charge in the photoelectric conversion section is discharged during the discharge period, the first clamping section clamps the signal voltage obtained from the active photoelectric conversion element during the readout period, the first clamping section measures the difference between the signal voltage obtained from the active photoelectric conversion element during the readout period and a signal voltage obtained from the active photoelectric conversion element after the discharge period, and the first sample hold section samples and holds the difference, the difference is transferred to the common signal line via the impedance conversion section and the switch section as the signal voltage, and the reset section resets the input of the impedance conversion section at the reference voltage while the signal voltage is being transferred to the common signal line, so that the signal voltage and the reference voltage are transferred to the common signal line as a set, the above operations are conducted for the active photoelectric conversion elements of one horizontal row, and the above operations conducted for the active photoelectric conversion elements of one horizontal row are repeated for the active photoelectric conversion elements of the remaining horizontal rows.

8. An active solid-state imaging device according to claim 2, wherein the active photoelectric conversion elements are a plurality of active photoelectric conversion elements arranged in a matrix, the signal voltage corresponding to the signal charge in the photoelectric conversion section of each of the active photoelectric conversion elements is read during the readout period, and the signal charge in the photoelectric conversion section is discharged during the discharge period, the first clamping section clamps the signal voltage obtained from the active photoelectric conversion element during the readout period, the first clamping section measures the difference between the signal voltage obtained from the active photoelectric conversion element during the readout period and a signal voltage obtained from the active photoelectric conversion element after the discharge period, and the first sample hold section samples and holds the difference, the difference is transferred to the common signal line via the impedance conversion section and the switch section as the signal voltage, and the reset section resets the input of the impedance conversion section at the reference voltage while the signal voltage is being transferred to the common signal line, so that the signal voltage and the reference voltage are transferred to the common signal line as a set, the above operations are conducted for the active photoelectric conversion elements of one horizontal row, as a subsequent operation, an additional discharge period is provided while the signal voltage is kept unchanged without clamping, so as to measure again the difference between the signal voltage obtained from the active photoelectric conversion element during the readout period and a signal voltage obtained from the active photoelectric conversion element after the additional discharge period, the difference is sampled and held by the first sample hold section, the difference is transferred to the common signal line via the impedance conversion section and the switch section as the signal voltage, and the reset section resets the input of the impedance conversion section at the reference voltage while the signal voltage is being transferred to the common signal line, so that the signal voltage and the reference voltage are transferred to the common signal line as a set, the subsequent operation is conducted for the active photoelectric conversion elements of one horizontal row and this is repeated for a predetermined number of times, and the above operations conducted for the active photoelectric conversion elements of one horizontal row are repeated for the active photoelectric conversion elements of the remaining horizontal rows.

\* \* \* \* \*